United States Patent

Wang

[19]

[11] Patent Number: 5,991,746
[45] Date of Patent: Nov. 23, 1999

[54] BILLING SYSTEM UTILIZING A MODIFIED FILE TRANSFER PROTOCOL FOR COLLECTING NON-FILE MIB TABLES FOR BILLING IN AN ATM NETWORK

[75] Inventor: Yifan Wang, Waterbury, Conn.

[73] Assignee: General DataComm, Inc., Middlebury, Conn.

[21] Appl. No.: 08/796,079

[22] Filed: Feb. 5, 1997

[51] Int. Cl.$^6$ .......................... G06F 17/60; H04M 15/00
[52] U.S. Cl. ...................... 705/40; 379/93.08; 370/321
[58] Field of Search ................... 705/1, 34, 40; 370/321; 379/93.07, 93.08

[56] References Cited

U.S. PATENT DOCUMENTS

| | | | |
|---|---|---|---|
| 5,438,614 | 8/1995 | Rozman et al. | 379/93.08 |
| 5,453,979 | 9/1995 | Schibler et al. | 370/395 |
| 5,490,252 | 2/1996 | Macera et al. | 395/200.79 |
| 5,713,075 | 1/1998 | Threadgill et al. | 455/427 |
| 5,757,784 | 5/1998 | Liebowitz et al. | 370/321 |
| 5,771,349 | 6/1998 | Picazo, Jr. et al. | 395/188.01 |
| 5,778,182 | 7/1998 | Cathey et al. | 395/200.49 |

*Primary Examiner*—Eric W. Stamber
*Attorney, Agent, or Firm*—David P. Gordon; David S. Jacobson; Thomas A. Gallagher

[57] ABSTRACT

An ATM billing system includes a data (billing) generator at each slot of an ATM switch, a plurality of billing collectors, and a billing center coupled to the ATM network. The data generators are provided with SNMP communication capability and with a modified TFTP communication capability. The data generators monitor the MIBs in their respective slots in ATM switches and, in particular, monitor the contents of tables which contain accounting information. When a table is 90% full, the data generator sends a trap to the billing collector associated with the particular switch and the billing collector sends a TFTP GET request to the data generator. The modified TFTP protocol in the data generator creates a pseudo filename, generates TFTP data packets containing the entire contents of the MIB billing table, and sends the packets according to TFTP protocol to the billing collector. The billing collector uses standard TFTP protocol to receive the TFTP packets and assemble them as a file which is stored. Upon successful receipt of the billing data, the billing collector sends the TFTP acknowledgement to the data generator and the data generator deletes the records in the MIB table for terminated calls. The billing collectors periodically read the billing data files and convert the data contained therein to a format which is suitable for the billing center.

17 Claims, 2 Drawing Sheets

Microfiche Appendix Included
(1 Microfiche, 35 Pages)

BILLING SYSTEM UTILIZING A MODIFIED FILE TRANSFER PROTOCOL FOR COLLECTING NON-FILE MIB TABLES FOR BILLING IN AN ATM NETWORK

MICROFICHE APPENDIX

This application contains a microfiche appendix consisting of one sheet of microfiche 35 frames.

BACKGROUND OF THE INVENTION

1. Field of the Invention

The invention relates to ATM switches. More particularly, the invention relates to methods and apparatus for collecting and processing billing information in ATM networks.

2. State of the Art

The modern telecommunications infrastructure is moving rapidly toward adopting an ATM (asynchronous transfer mode) standard. The ATM technology has been evolving for many years and is continuing to evolve. While many aspects of ATM technology have been agreed upon, many are still in relatively early stages of development. For example, since ATM technology is only recently being deployed for commercial use, there are no agreed upon standards for collecting billing information from an ATM network.

Presently, all of the operations, administration, and maintenance (OAM) of an ATM network is accomplished pursuant to an interim specification which provides for two types of management information base (MIB). The first MIB is the interim local management interface (ILMI) MIB which is utilized at a user network interface (UNI). The second MIB is the ATM MIB which is utilized at a network to network interface (NNI) between ATM switches. According to the interim specification, access to the MIB information is provided via the Simple Network Management Protocol (SNMP). The MIBs are implemented by a management entity which resides at the interface and which contains an SNMP agent and typically a management application.

The MIBs each contain several groups of information, each group being stored as a table in RAM at the management entity. For example, the ILMI MIBs include tables for a physical group, an ATM layer group, a layer statistics group, VPC and VCC groups, and network prefix and address groups. The ATM MIBs include tables for an interface configuration group, a DS3 PLCP group, a TC sublayer group, VPL and VCL groups, VP and VC cross-connect groups, and the AAL5 connection performance statistics group.

According to various schemes being implemented presently, accounting information is derived from statistics stored in MIBs. The accounting information is then used to create billing information in order to bill customers for use of the ATM network. Generally, a separate billing MIB is provided for each slot controller (interface) in an ATM switch. Each billing MIB typically includes 500 entries (also referred to as records or rows). In order to gather the statistics from the MIBs, a "billing collector" entity must communicate with the ATM switch(es) using the SNMP protocol and gather data from each MIB. The SNMP protocol requires that information be retrieved from MIB tables one record at a time. For example, a typical sequence of SNMP commands from a billing collector involves repeated use of the GET command as illustrated in the code listing below.

```
repeat
(
    SNMP GET-Has slot restarted since last poll period
    SNMP GET-how many available records
    while (outstanding records)
    (
        SNMP GETNEXT-First row in table
        save record to file
        SNMP GET-Delete first row
    )
    wait (poll_period)
)
```

This is a tedious procedure which taxes the processing resources in the ATM switches because it is relatively time consuming. This is further exacerbated by the fact that the MIBs are stored in RAM. The entries in the billing table will roll over and be lost if not read before the table fills. Therefore, the entries must be accumulated from the MIBs in a timely manner.

SUMMARY OF THE INVENTION

It is therefore an object of the invention to provide a billing system for use in an ATM network.

It is also an object of the invention to provide a billing system which collects statistics from MIBs in ATM switches with a faster data transfer speed and generates customer bills based on the statistics collected.

It is another object of the invention to provide a billing system for use in an ATM network which does not unduly tax the resources of processors in ATM switches.

It is still another object of the invention to provide a billing system for use in an ATM network which collects statistics in a timely manner.

It is also an object of the invention to provide a billing system for use in an ATM network which protects billing statistics from accidental loss.

It is another object of the invention to provide a billing system for use in an ATM network which protects billing statistics from unauthorized access.

In accord with these objects which will be discussed in detail below, the billing system of the present invention includes a data (billing) generator at each slot of an ATM switch, a plurality of billing collectors at different nodes in the ATM network, and a billing center coupled to the ATM network. According to the invention, the data generators are provided with SNMP communication capability and with a modified TFTP communication capability. The data generators monitor the MIBs in their respective slots of an ATM switch and, in particular, monitor the contents of tables which contain accounting information. When a table is 90% full, the data generator sends a trap to the billing collector associated with the particular switch and the billing collector sends a TFTP GET request (e.g., "get bill.tb1") to the data generator. The modified TFTP protocol in the data generator creates a pseudo filename (e.g., "bill.tb1"), generates TFTP data packets containing the entire contents of the MIB billing table, and sends the packets according to TFTP protocol to the billing collector. Using the standard TFTP protocol, the billing collector receives the TFTP packets and assembles them as a file which is stored on non-volatile media. Upon successful receipt of the billing data, the billing collector sends the TFTP acknowledgement to the data generator and the data generator deletes the records in the MIB table for terminated calls. The billing collectors convert the data contained in billing data files to a format which is suitable for the billing center. In particular, the billing collectors create billing records for multicast, bi-directional, and uni-directional billing based on the data in the files received from the data generators. When the billing collector has completely processed a billing file and the file is in the proper format for the billing center, the billing collector advertises that a file is available. The billing center collects the files via FTP or any other method in order to prepare customer bills.

According to presently preferred embodiments of the invention, the billing generator generates billing records and traffic information on a per virtual circuit (SPVC/PVC/SVC) basis. The SPVC billing records are generated at the source and destination slots when a SPVC is active or terminated. The PVC and SVC billing records are generated at every slot utilized by the PVC or SVC when the PVC or SVC is active or terminated. A billing record is generated or updated for each active VC at user selected regular intervals and when a VC is terminated. The billing records are preferably stored in a reserved non-volatile RAM area so that the records are retained in the case of a switch warm start. According to a presently preferred embodiment, each billing record includes a maximum of 228 bytes of data and a RAM area of 114 kilobytes is reserved to hold at least 500 billing records. Billing records from cell processing controller cards are based on cell counts and billing records from adaptation controller cards are based on frame counts. ILMI traffic and OAM traffic are excluded from billing records. The ILMI traffic has a designated PVC which is excluded from generating billing records. According to the invention, the OAM traffic software is modified to provide the billing generators with OAM cell counts so that the OAM traffic can be excluded from the billing traffic measurement.

According to a presently preferred embodiment of the invention, billing security is controlled by an authentication table at each ATM switch. Only users registered in the authentication table can effect TFTP or SNMP access to the billing information for the switch.

Utilizing the modified TFTP protocol of the invention, a billing collector can retrieve 500 billing records in about 40 seconds. In comparison, utilizing the prior art SNMP protocol, a billing collector would take approximately 487 seconds to retrieve 500 billing records.

Additional objects and advantages of the invention will become apparent to those skilled in the art upon reference to the detailed description taken in conjunction with the provided figures.

BRIEF DESCRIPTION OF THE APPENDICES

Microfiche Appendix 1 is a C-language source code listing of the operations of a data generator (bill.c); and Microfiche Appendix 2 is a C-language source code listing of the modified TFTP protocol according to the invention (tftp.c); and Microfiche Appendix 3 is a listing of the billing MIB group used by the data generator.

DETAILED DESCRIPTION OF THE PREFERRED EMBODIMENTS

Figure 1:
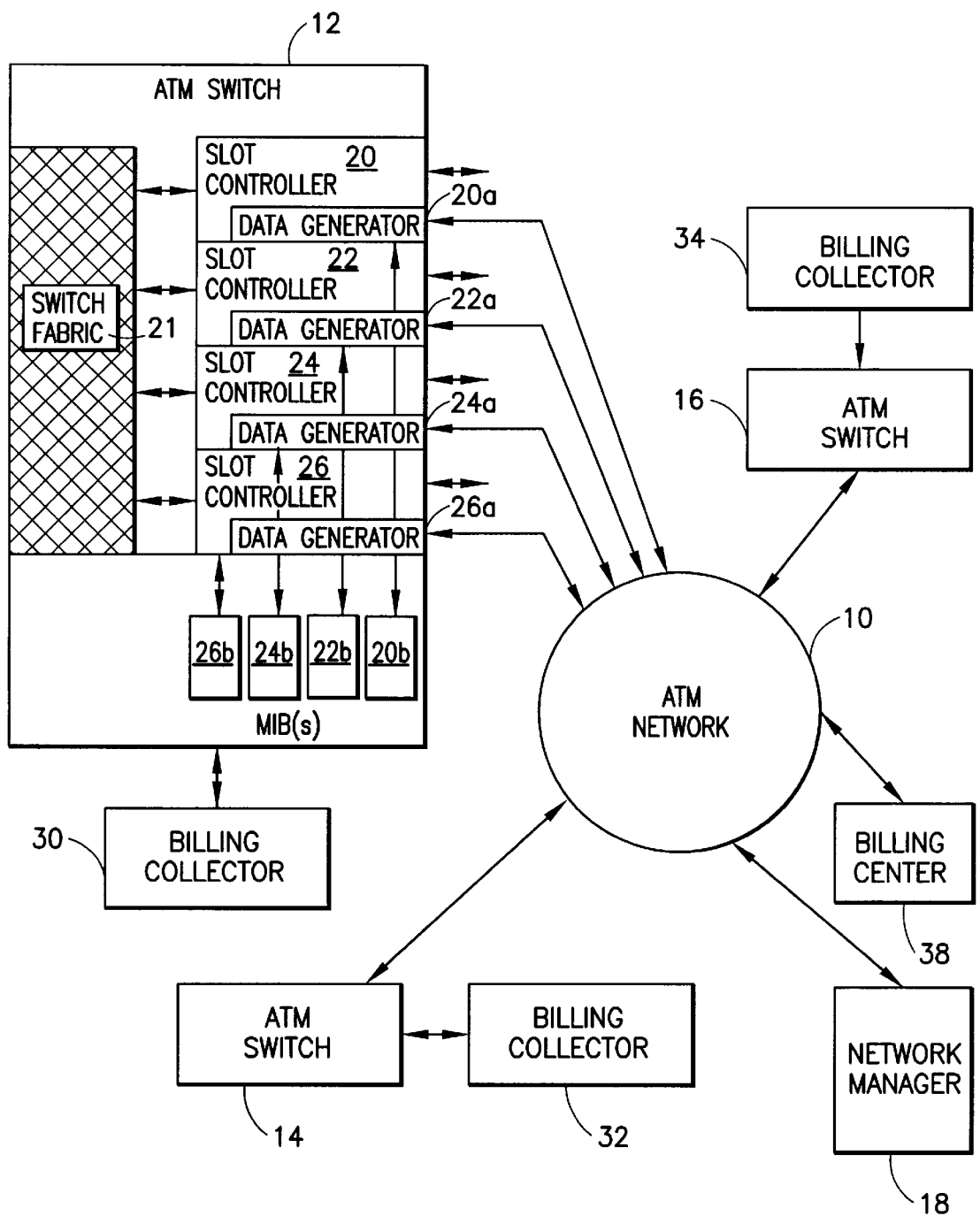
FIG. 1 is a schematic block diagram of an ATM network billing system according to the invention.

Referring now to FIG. 1, a billing system according to the invention is incorporated within an ATM network 10 which includes a plurality of ATM switches 12, 14, 16, for example, and a network manager 18. Each ATM switch, e.g. 12, includes a plurality of slot controllers, e.g. 20, 22, 24, 26 which interface the switch with users and the network and which are coupled to each other via a switch fabric 21. According to a preferred embodiment of the invention, each ATM switch in the billing system is an APEX™ switch manufactured by General DataComm, Inc. of Middlebury, Conn. Each slot controller in an ATM switch is provided with a data generator, e.g. 20*a*, 22*a*, 24*a*, 26*a* which gathers data from the slot controllers and stores the data in a respective MIB, e.g. 20*b*, 22*b*, 24*b*, 26*b* for each slot controller. Optionally, a single MIB can be written to by each of the slot controllers. A billing collector 30, 32, 34 is coupled to each switch 12, 14, 16 and a billing center 36 is coupled to the ATM network 10. According to a presently preferred embodiment, each billing collector is embodied as an application on an adjunct processor (e.g. a SUN workstation) which communicates with the ATM switch via an Ethernet connection. The network manager 18 coordinates the billing system by managing the switches 12, 14, 16, by controlling and monitoring the billing collectors 30, 32, 34, and by providing network wide configuration service. Since each card has its own IP address, the billing collector can retrieve billing records from each slot controller by addressing it.

According to a presently preferred embodiment, the MIB associated with each data generator includes five variables relating to billing control operations and a table having thirty-one fields (columns). These variables and table columns are defined in Microfiche Appendix 3.

Generally, the five variables in the billing MIB include: the number of entries in the billing table, the number of records lost because the table was full, a variable to enable or disable billing, an integer indicating the billing period in seconds, and a variable to control generating new records or updating existing records.

The thirty-one fields in each billing record (table row) include: sequence number, source VPI, source VCI, destination VPI, destination VCI, source slot, source link, destination slot, destination link, called E.164 address, called E.164 subaddress, calling E.164 address, calling E.164 subaddress, count of incoming cell overflow, count of incoming cells, count of incoming frames, count of incoming bytes overflow, count of incoming bytes, count of outgoing cell overflow, count of outgoing cells, count of outgoing frames, count of outgoing bytes overflow, count of outgoing bytes, an integer indicating the reason why an SVC was cleared, the start time and date of the call, the end time and date of the call, a flag indicating if the record can be deleted, and a bill tag indicating the billable SVC. Not all fields are used for each record. Different types of VCs will utilize different subsets of these fields. For example, billing records from cell processing controller cards include cell counts but no frame counts and billing records from adaptation controller cards include frame counts but no cell counts.

As mentioned above, the data generator is provided with a modified TFTP protocol which is shown in Microfiche Appendix 2. The standard TFTP protocol uses a packet size of 512 bytes. The initial read request (RRQ) or write request (WRQ) packet has the format "opcode (two bytes), filename (string), 0 (one byte), mode (string), 0 (one byte)", where the opcode is RRQ or WRQ and the mode is netascii, octet, or mail. The TFTP data packets have the format "opcode (two bytes), block number (two bytes), data (n bytes≦508 bytes), where the opcode indicates that the packet contains data.

According to standard TFTP protocol, in RRQ mode, the contents of the requested file are read into the TFTP packet buffer, the packets are copied to the UDP layer, the IP layer, and then are delivered to the requesting entity in the physical layer. In WRQ mode, the received packets are written to a file with the requested file name. Generally, the standard TFTP protocol can be viewed as a state machine. In the absence of any pending file transfer, the protocol is in an idle state. When an RRQ or WRQ request is received, the protocol moves to either a "sendfile" or "getfile" state where it remains until file transfer is completed or an error occurs. Upon completion of file transfer, or upon an error, the protocol moves to a dying state where it remains for a specified time before returning to the idle state.

According to the invention, the TFTP protocol in each slot of an ATM switch is modified to assign a unique file name (e.g. "bill.tb1") for the TFTP transfer of billing records from an SNMP MIB table. Upon receiving the TFTP message "GET (RRQ) bill.tb1" from a billing collector which uses standard TFTP, rather than scanning a disk directory for a file with the corresponding name, with the modified TFTP protocol, the data generator moves to the sendfile state and data is read from the billing table of the MIB into TFTP data packets with the file name bill.tb1. Upon completion of reading the last billing MIB entry, the modified TFTP protocol sends an end of file indication to the billing collector. After receiving the standard TFTP acknowledgement from the billing collector that the last packet has been received, the modified TFTP protocol will delete the billing records for terminated VCs. More particularly, and with reference to Microfiche Appendix 2, a new function "tftp_writemib" is called at page 7 of Microfiche Appendix 2 to read data from the MIB table into TFTP packets which are sent to the billing collector and a new function "delete_bill_record" is called at page 6 of Microfiche Appendix 2 to delete records from the MIB table using SNMP's deleting MIB table entry function in SNMP agent code.

Figure 2:
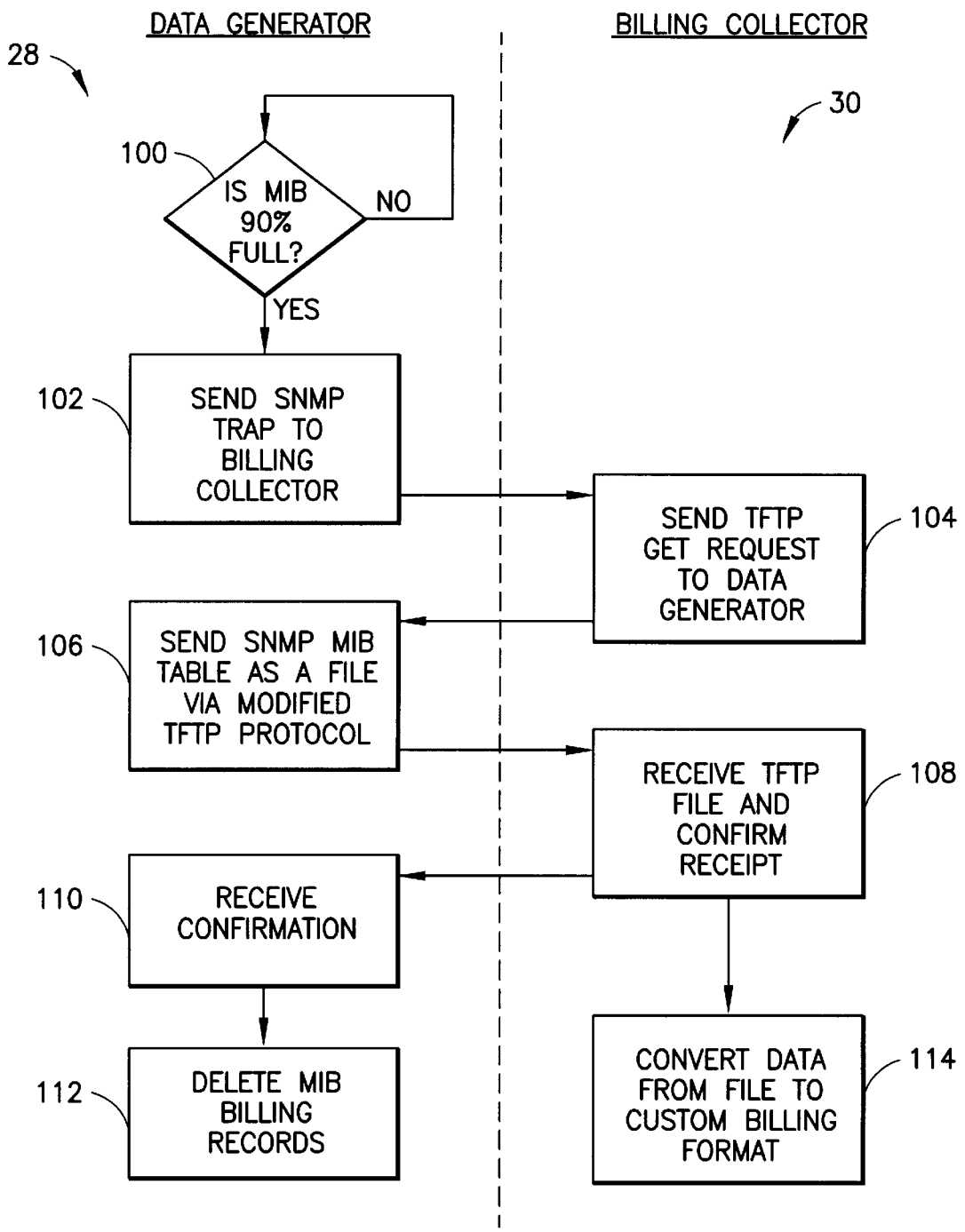
FIG. 2 is a flow chart illustration the basic flow of information between the data generators and the billing collectors.

According to the presently preferred embodiment of the invention, whenever a new VC is established, the data generators will create a new billing record in an MIB table using SNMP's adding MIB table entry function in SNMP agent code, and will alert the billing collectors when an MIB table is almost full. FIG. 2 illustrates the basic flow of information between a data generator and a billing collector.

Turning now to FIG. 2, the data generator 28 monitors the contents of the MIB at 100 to determine if the MIB is 90% full. If it is determined to be 90% full, the data generator sends an SNMP trap at 102 to the billing collector 30. When the billing collector receives the trap, the billing collector sends a TFTP GET request at 104 to the data generator. Upon receiving the GET request, the data generator sends the SNMP MIB data via the modified TFTP protocol at 106 to the billing collector. After all of the packets have been received, the billing collector sends a confirmation of receipt at 108 to the data generator. When the data generator receives confirmation at 110 that the billing data has been successfully transferred, the data generator deletes the MIB records for terminated calls at 112. Meanwhile, the billing collector reads the received file and converts the format of the data therein at 114 to a standard format which will be described below.

The billing file bill.tb1 which is received by the billing collector has the format: 1;1;11;1;22;2;0;2;0;00;00;00;00;0;0;0;0;0;0;0;0;0; vbr high; 0;01 January 1997 06:40:59;01 January 1997 06:44:56; valid; 0;0;0.

Referring once again to FIG. 1, according to the invention, the billing center will retrieve billing data files from the billing collectors and prepare customer bills. It is contemplated that the system according to the invention may be used by several different ATM service providers and each service provider will have its own billing format. In order to provide different billing centers with a consistent data structure for use in creating customer bills, the billing collectors reformat the billing data collected from the data generators in a standardized format for use by different billing centers.

There have been described and illustrated herein several embodiments of an ATM billing system using a modified TFTP protocol to retrieve SNMP MIB data. While particular embodiments of the invention have been described, it is not intended that the invention be limited thereto, as it is intended that the invention be as broad in scope as the art will allow and that the specification be read likewise. Thus, while particular formats have been disclosed with regard to the billing tables and the billing files, it will be appreciated that other formats could be utilized. Also, while particular arrangements of data generators and billing collectors have been shown, it will be recognized that other arrangements could be used with similar results obtained. Moreover, while particular configurations have been disclosed in reference to the allocation of RAM and other resources, it will be appreciated that other configurations could be used as well. Furthermore, while the billing system has been disclosed as having a particular number of data generators and billing collectors, it will be understood that different numbers of data generators and billing collectors can achieve the same or similar function as disclosed herein. In addition, it will be appreciated that the modified TFTP protocol according to the invention can also be used by a network management system to obtain a large amount of MIB information across a network for monitoring a network and with a much faster transfer rate than SNMP protocol.

It will therefore be appreciated by those skilled in the art that yet other modifications could be made to the provided invention without deviating from its spirit and scope as so claimed.

I claim:

1. A billing system for use in an ATM network having a plurality of ATM switches, each of said switches responding to network users either directly or indirectly, via intermediate ATM switches, such that each of said switches establishes virtual connections from one network user to another network user, said system comprising:

a) at least one data generator associated with one of the ATM switches, said data generator having means for generating billing data when virtual connections are established through the one of the switches and means for storing said billing data in an MIB table, said data generator having a modified TFTP communications capability, said modified TFTP communications capability including means for reading said billing data from said MIB table, means for generating TFTP packets containing said billing data read from said MIB table, and means for sending TFTP packets via TFTP protocol; and b) a billing collector associated with the one of the ATM switches, said billing collector having standard TFTP communications capability, said standard TFTP communications capability includes means for receiving TFTP packets and means for saving data contained in TFTP packets to a file, wherein said at least one data generator reads said billing data from said MIB table, generates TFTP data packets containing said billing data, and sends said TFTP packets via TFTP protocol to said billing collector and said billing collector saves said billing data as a file.

2. A billing system according to claim 1, wherein:

said means for sending TFTP packets sends substantially the entire contents of said MIB table to said billing collector as a single file.

3. A billing system according to claim 1, wherein:

said at least one data generator includes means for monitoring the quantity of said billing data stored in said MIB table and means for sending an indication to said billing collector when said MIB table is a predetermined percentage filled, and in response to said indication, said billing collector sends a TFTP GET request to said at least one data generator.

4. A billing system according to claim 3, wherein:

said indication is an SNMP trap.

5. A billing system according to claim 3, wherein:

in response to said TFTP GET request, said at least one data generator reads substantially all of said billing data from said MIB table and sends a single file containing substantially all of said billing data from said MIB table via modified TFTP protocol to said billing collector.

6. A billing system according to claim 1, further comprising:

c) a billing center coupled to the ATM network, said billing center having means for communicating with said billing collector, wherein said billing center receives said file from said billing collector and uses said billing data to create customer bills.

7. A billing system according to claim 1, wherein:

the one of the ATM [switch] switches has a plurality of slot controllers and said at least one data generator includes one data generator for each slot controller.

8. A billing system for use in an ATM network having a plurality of ATM switches, each of said switches responding to network users either directly or indirectly, via intermediate ATM switches, such that each of said switches establishes virtual connections from one network user to another network user, said system comprising:

a) a plurality of data generators, each data generator associated with a respective ATM switch and having means for generating billing data based on virtual connections established through said respective ATM switch and means for storing said billing data in a respective MIB table, each of said data generators having a modified TFTP communications capability, said modified TFTP communications capability including means for reading said billing data from said MIB table, means for generating TFTP packets containing said billing data read from said MIB table, and means for sending TFTP packets via TFTP protocol; and b) a plurality of billing collectors, each billing collector associated with an ATM switch, said billing collectors having standard TFTP communications capability, said standard TFTP communications capability includes means for receiving TFTP packets and means for saving data contained in TFTP packets to a file, wherein each of said data generators reads said billing data from said MIB table, generates TFTP data packets containing said billing data, and sends said TFTP packets via modified TFTP protocol to a respective billing collector and said respective billing collector saves said billing data as a file.

9. A billing system for use in an ATM telecommunications network, comprising:

a) an ATM switch coupled to the network and including means responsive either directly or indirectly to network users for establishing virtual connections through said ATM switch between said network users, said ATM switch having data generator means for generating billing data based on said virtual connections established through said ATM switch and storing said billing data in an MIB table, said data generator means having a modified TFTP communications capability, said modified TFTP communications capability including means for reading said billing data from said MIB table, means for generating TFTP packets containing said billing data read from said MIB table, and means for sending TFTP packets via TFTP protocol; and b) a billing collector associated with said ATM switch, said billing collector having TFTP communications capability, said TFTP communications capability includes means for receiving TFTP packets and means for saving data contained in TFTP packets to a file, wherein said data generator means reads said billing data from said MIB table, generates TFTP data packets containing said billing data, and sends said TFTP packets via modified TFTP protocol to said billing collector and said billing collector saves said billing data as a file.

10. A method of generating and collecting billing information in an ATM network having a plurality of ATM switches, each of the switches responding to network users either directly or indirectly, via intermediate ATM switches, such that each of the switches establishes virtual connections from one network user to another network user, said system, comprising:

a) generating billing data based on the virtual connections established through an ATM switch;

b) storing the billing data in an MIB table;

c) reading the billing data from the MIB table;

d) generating TFTP packets containing the billing data read from the MIB table; and e) sending the TFTP packets via a modified TFTP protocol to a billing collector.

11. A method according to claim 10, wherein:

said step of sending TFTP packets includes sending substantially the entire contents of the MIB table to the billing collector as a single file.

12. A method according to claim 10, further comprising:

f) monitoring the quantity of the billing data stored in the MIB table;

g) sending an indication to the billing collector when the MIB table is a predetermined percentage filled; and h) sending a TFTP Get request from the billing collector to the ATM switch in response to the indication, wherein said step of sending the TFTP packets is in response to the TFTP GET request.

13. A method according to claim 12, wherein:

the indication is an SNMP trap.

14. A method of transmitting MIB information from an MIB table in an ATM switch over an ATM network where MIB table entries are made by the switch when virtual connections are established between network users through the switch, said method comprising:

a) reading data from the MIB table in the ATM switch;

b) generating TFTP packets containing the data read from the MIB table; and c) sending the TFTP packets via a modified TFTP protocol from the ATM switch to a data requestor.

15. A method according to claim 14, wherein:

said step of sending the TFTP packets includes sending substantially the entire contents of the MIB table to the data requester as a single file.

16. A method according to claim 14, further comprising:

d) monitoring the quantity of data stored in the MIB table in the ATM switch;

e) sending an indication to the data requestor when the MIB table is a predetermined percentage filled; and f) sending a TFTP Get request from the data requestor to the ATM switch in response to the indication, wherein said step of sending the TFTP packets is in response to the TFTP GET request.

17. A method according to claim 16, wherein:

the indication is an SNMP trap.

* * * * *